US011152976B2

(12) United States Patent
Cho et al.

(10) Patent No.: US 11,152,976 B2
(45) Date of Patent: Oct. 19, 2021

(54) MULTI-TRANSMISSION SYSTEM STRUCTURE AND MOBILE TERMINAL EMPLOYING SAME

(71) Applicant: LG ELECTRONICS INC., Seoul (KR)

(72) Inventors: Eunbit Cho, Seoul (KR); Byoungjoo Kang, Seoul (KR); Younghee Kang, Seoul (KR); Dongsu Won, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 16/629,488

(22) PCT Filed: Feb. 7, 2019

(86) PCT No.: PCT/KR2019/001517
§ 371 (c)(1),
(2) Date: Jan. 8, 2020

(87) PCT Pub. No.: WO2020/059981
PCT Pub. Date: Mar. 26, 2020

(65) Prior Publication Data
US 2021/0226672 A1 Jul. 22, 2021

(30) Foreign Application Priority Data

Sep. 21, 2018 (KR) .................... 10-2018-0113830
Dec. 11, 2018 (KR) .................... 10-2018-0159405

(51) Int. Cl.
*H04B 1/04* (2006.01)
*H04B 7/0413* (2017.01)
*H04B 7/0404* (2017.01)

(52) U.S. Cl.
CPC ......... *H04B 7/0413* (2013.01); *H04B 1/0483* (2013.01); *H04B 7/0404* (2013.01); *H04B 2001/0408* (2013.01)

(58) Field of Classification Search
CPC .... H04B 2001/0416; H04B 2001/0408; H04B 1/3827; H04B 7/0404; H04B 7/0413;
(Continued)

(56) References Cited

U.S. PATENT DOCUMENTS

2017/0222847 A1    8/2017 Feher
2018/0152144 A1*   5/2018 Choo .................. H04B 1/1607
(Continued)

FOREIGN PATENT DOCUMENTS

CN    103475386 A    12/2013
CN    105703716 A     6/2016
(Continued)

OTHER PUBLICATIONS

"Simulation for 5G New Radio System Design and Verification", White Paper, Keysight Technologies, USA, 5992-3032EN, Jun. 6, 2018, 12 pages.
Lie et al., "A Review of 5G Power Amplifier Design at cm-Wave and mm-Wave Frequencies", Hindawi, Wireless Communications and Mobile Computing, Jul. 4, 2018, vol. 2018, Article ID 6793814, 16 pages.

Primary Examiner — Rahel Guarino
(74) Attorney, Agent, or Firm — Birch, Stewart, Kolasch & Birch, LLP

(57) ABSTRACT

A mobile terminal includes a first power amplifier configured to amplify and output a first signal of a 5G communication system; a first antenna connected to the first power amplifier and configured to transmit the first signal amplified and output from the first power amplifier as a first transmission signal; a second power amplifier configured to amplify and output a second signal of the 5G communication system; a second antenna connected to the second power amplifier and configured to transmit the second signal amplified and (Continued)

output from the second power amplifier as a second transmission signal; and a power controller connected to the first power amplifier and the second power amplifier and including a common voltage booster configured to provide a supply voltage to both of the first power amplifier and the second power amplifier at a same timing.

19 Claims, 9 Drawing Sheets

(58) Field of Classification Search
CPC .... H04B 1/0483; H04W 88/06; H04W 88/02; H04W 52/0209
See application file for complete search history.

(56) References Cited

U.S. PATENT DOCUMENTS

| | | | |
|---|---|---|---|
| 2019/0273314 A1* | 9/2019 | Wloczysiak | H04B 1/0458 |
| 2019/0327714 A1* | 10/2019 | Wang | H04B 7/0417 |
| 2019/0327779 A1* | 10/2019 | Lee | H04L 1/1854 |

FOREIGN PATENT DOCUMENTS

| | | |
|---|---|---|
| CN | 205726443 U | 11/2016 |
| CN | 106803747 A | 6/2017 |
| KR | 10-1463239 B1 | 11/2014 |
| KR | 10-2017-0065907 A | 6/2017 |
| WO | WO 2020/005998 A1 | 1/2020 |

* cited by examiner (a)

(b)

MULTI-TRANSMISSION SYSTEM STRUCTURE AND MOBILE TERMINAL EMPLOYING SAME

CROSS-REFERENCE TO RELATED APPLICATIONS

This Application is a National Phase of PCT International Application No. PCT/KR2019/001517 filed on Feb. 7, 2019, which claims the priority benefit under 35 U.S.C. § 119(a) to Korean Patent Application Nos. 10-2018-0159405 filed in the Republic of Korea on Dec. 11, 2018 and 10-2018-0113830 filed in the Republic of Korea on Sep. 21, 2018, all of which are hereby expressly incorporated by reference into the present application.

BACKGROUND OF THE INVENTION

Field of the Invention

The present disclosure relates to a multi-transmission system structure and a mobile terminal employing the multi-transmission system structure, and, more particularly, to a power amplifier and a mobile terminal in a heterogeneous radio system.

Discussion of the Related Art

Terminals may be divided into mobile/portable terminals and stationary terminals according to mobility. Also, the mobile terminals may be classified into handheld types and vehicle mount types according to whether or not a user can directly carry.

Functions of mobile terminals have been diversified. Examples of such functions include data and voice communications, capturing images and video via a camera, recording audio, playing music files via a speaker system, and displaying images and video on a display. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player. Efforts are ongoing to support and increase the functionality of mobile terminals. Such efforts include software and hardware improvements, as well as changes and improvements in the structural components.

In addition to those attempts, the mobile terminals provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated to provide 5G communication services.

In this connection, a mobile terminal needs to support Uplink (UL) Multiple Input Output (MIMO) in a heterogeneous radio system. The UL MIMO types supportable in the heterogeneous radio system include 4G MIMO, 5G MIMO, and 4G+5G Dual Connectivity (DC). In order to support realization of these various types of radio interfaces, power amplifiers having different configurations have to be provided. For example, a 4G communication system can transmit a first signal through a first power amplifier and a first antenna. Alternatively, a 5G communication system can transmit a second signal through a second power amplifier and a second antenna.

However, when the 4G communication system or the 5G communication system includes its own power amplifier, there is a problem in that space for deployment increases, power consumption increases, and control complexity increases. In addition, when power supply apparatuses for multiple power amplifiers, that is, a first power amplifier and a second power amplifier, are present individually, there is a problem in that power supply control for operating the multiple power amplifiers is complex.

Also, the 5G communication requires a higher-level precision of timing alignment for frame timing than the 4G communication system. Therefore, in UL-MIMO that uses the 5G communication system, the timing alignment between multiple channels has to be ensured. However, there is a problem in that a hardware structure and a control method are not available that are capable of controlling a timing alignment error between channels for the multiple power amplifiers that are included in the 5G communication system, in such a manner that the timing alignment error falls to a specific level or lower.

SUMMARY OF THE INVENTION

Accordingly, one object of the present disclosure is to address the above-described problems and other problems. In addition, another object of the present disclosure is to provide a mobile terminal that has an RF front-end common structure capable of supporting Uplink MIMO in multiple radio systems.

Still another object of the present disclosure is to provide a mobile terminal that has an improved timing alignment error characteristic when performing multiple uplink transmissions.

In order to accomplish the above-described objects and other objects, according to an aspect of the present disclosure, there is provided a mobile controller including a first power amplifier that is configured to amplify and output a first signal; a second power amplifier that is configured to amplify and output a second signal; and a controller 300 that performs control in such a manner that each of the first power amplifier and the second power amplifier amplifies any one of the multiple communication systems, in which an RF front-end common structure capable of supporting Uplink MIMO in the multiple radio systems is employed.

In order to accomplish the above-described objects and other objects, according to an aspect of the present disclosure, there is provided a mobile terminal including: a first power amplifier that is configured to amplify and output a first signal of a 5G communication system; a second power amplifier that is configured to amplify and output a second signal of the 5G communication system; and a power controller including a voltage booster that is connected to the first power amplifier and the first power amplifier and controls voltage that is to be supplied to the first power amplifier and the first power amplifier, in which a timing alignment error characteristic is improved. Accordingly, the voltage that is to be supplied to the first power amplifier and the second power amplifier can be controlled by the one voltage booster at the same time.

In the mobile terminal, the voltage booster may be controlled by a control signal in a modem (a baseband processor). In this case, the modem may be operable in the 4G communication system and the 5G communication system and may process multiple different signals of the 4G communication system and the 5G communication system.

The mobile terminal may further include a first driving amplifier that is connected to the first power amplifier, amplifies a signal that is output from the modem, and provides the first signal to the first power amplifier. In addition, the mobile terminal may further include a second driving amplifier that is connected to the second power amplifier, amplifies a signal that is output from the modem, and provides the second signal to the second power amplifier. Accordingly, with the first driving amplifier and the second driving amplifier that are provided separately, envelopes of the first signal and the second signal on the per-resource block (RB) basis may be controlled according to an individual radio access technology (RAT).

In the mobile terminal, the modem may perform envelope tracking (ET) associated with the first signal and the second signal, on the per-resource block (RB) basis. In this connection, based on a result of the envelope tracking, the first driving amplifier and the second driving amplifier may adjust power levels of the first signal and the second signal.

In the mobile terminal, with the voltage that is supplied from the voltage booster to the first power amplifier and the second power amplifier at the same time, a timing error may be controlled to fall to a fixed level or lower. Specifically, the timing error between a first transmission signal that is output by the first power amplifier and a second transmission signal that is output by the second power amplifier may be equal to or shorter than a symbol duration of the 5G communication system.

In the mobile terminal, the first power amplifier and the second power amplifier may amplify the first signal and the second signal, respectively, of the 5G communication system. Accordingly, the transmission signal and the second transmission signal may be transmitted to a first base station through a first antenna and a second antenna, respectively, within a range of the timing error, and thus 5G Uplink (UL) MIMO may be performed.

In the mobile terminal, the first power amplifier and the second power amplifier may amplify the third signal and the fourth signal, respectively, of the 4G communication system. Accordingly, the third transmission signal and the fourth transmission signal may be transmitted to a second base station through a first antenna and a second antenna, respectively, and thus 4G Uplink (UL) MIMO may be performed.

In the mobile terminal, one of the first power amplifier and the second power amplifier may operate in the 4G communication system, and the other may operate in the 5G communication system. Accordingly, 4G-5G E-UTRAN NR Dual Connectivity (EN-DC) may be performed.

In the mobile terminal, the modem (the baseband processor) may perform control in such a manner that any one of 2×2 4G UL MIMO, 4G-5G EN-DC, and 2×2 5G UL MIMO is performed through the first antenna and the second antenna. Accordingly, there is an advantage in that a radio connection state and a transmission method can be controlled according to a radio channel state.

In the mobile terminal, the modem may perform control in such a manner that any one of 4×4 4G Downlink (DL) MIMO, 4G-5G EN-DC, and 4×4 5G DL MIMO is performed through the first antenna to the fourth antenna. Accordingly, there is an advantage in that a radio connection state and a reception method can be controlled dynamically according to the radio channel state.

Advantageous Effect

Effects of a power amplifier and a mobile terminal employing the power amplifier in a heterogeneous radio system according to the present disclosure are described as follows. According to at least one of the embodiments of the present disclosure, the mobile terminal employing an RF front-end common structure capable of supporting Uplink MIMO in multiple radio systems can be provided. Accordingly, there is an advantage in that, in various types of MIMO structures, space for deployment decreases, power consumption decreases, and control complexity decreases.

According to at least one of the embodiments of the present disclosure, the mobile terminal that has an improved timing alignment error characteristic when performing multiple uplink transmissions can be provided. Specifically, there is an advantage in that a hardware structure and a control method can be provided that is capable of controlling a timing alignment error between channels for multiple power amplifiers that are included in a 5G communication system, in such a manner that the timing alignment error falls to a specific level or lower.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

DETAILED DESCRIPTION OF THE EMBODIMENTS

Figure 1A:
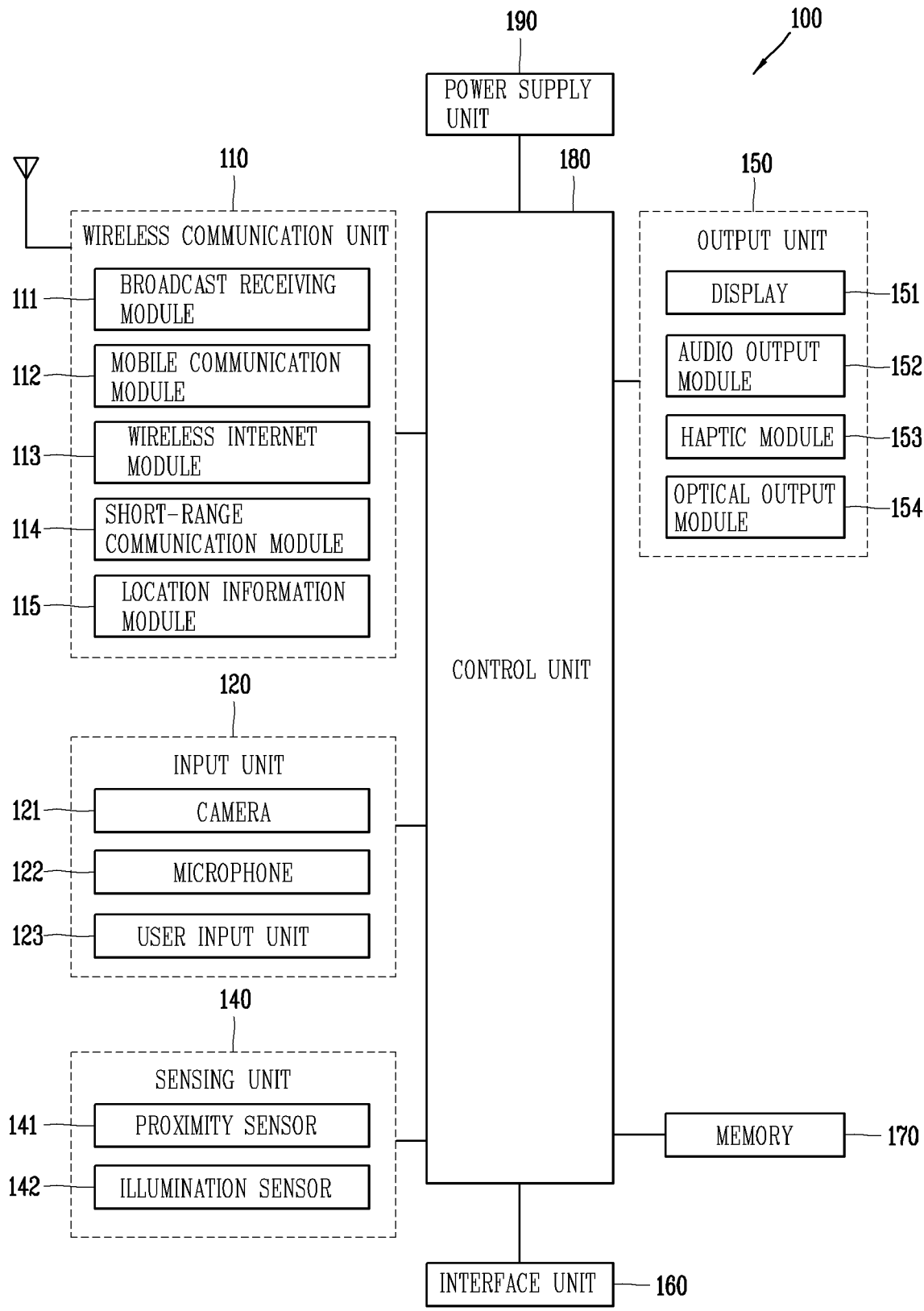
FIG. 1A is a block diagram for describing a mobile terminal according to the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
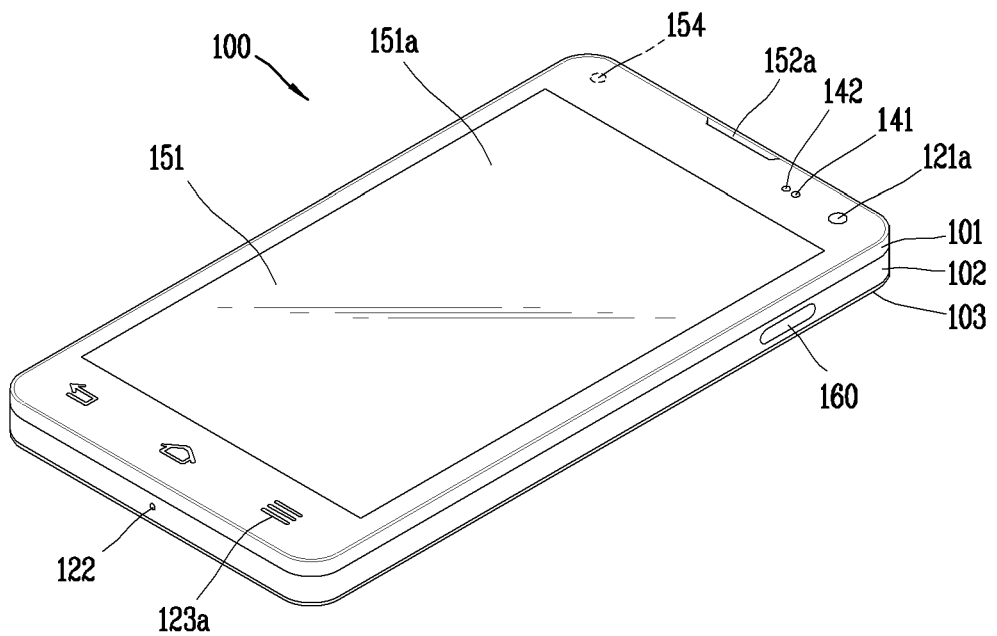
FIGS. 1B and 1C are block diagrams, each illustrating an example of the mobile terminal according to the present disclosure, when viewed from different directions.
Figure 1C:
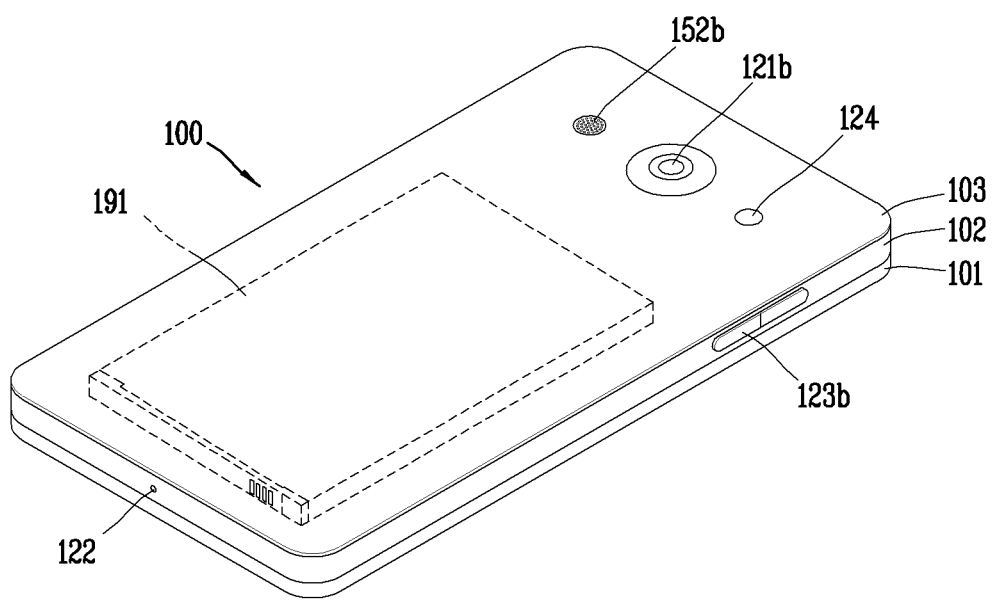

Referring to FIGS. 1A to 1C, FIG. 1A is a block diagram of a mobile terminal in accordance with one exemplary embodiment of the present disclosure, and FIGS. 1B and 1C are conceptual views illustrating one example of a mobile terminal, viewed from different directions. The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115. The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Referring to FIGS. 1B and 1C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well. Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display 151 is shown located on the front side of the terminal body to output information. As illustrated, a window 151a of the display 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases forms an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may not be located on the front surface of the terminal body, and the second audio output module 152b may be located on the side surface of the terminal body other than the rear surface of the terminal body.

The display 151 is generally configured to output information processed in the mobile terminal 100. For example, the display 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display. The display 151 may be implemented using two display devices, according to the configuration type thereof. For instance, a plurality of the displays 151 may be arranged on one side, either spaced apart from each other, or these devices may be integrated, or these devices may be arranged on different surfaces.

The display 151 may include a touch sensor that senses a touch with respect to the display 151 so as to receive a control command in a touch manner. Accordingly, when a touch is applied to the display 151, the touch sensor may sense the touch, and a controller 180 may generate a control command corresponding to the touch. Contents input in the touch manner may be characters, numbers, instructions in various modes, or a menu item that can be specified.

In addition, the touch sensor may be configured in a form of a film having a touch pattern and disposed between a window 151a and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display 151 may form a touch screen together with the touch sensor, and in this case, the touch screen may function as the user input unit (123, see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia playback sounds.

The window 151a of the display 151 may include sound holes for emitting sounds generated from the first audio output module 152a. However, the present disclosure is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured as a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display 151, or the like.

Further, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display 151, or the like. The rear input unit may be implemented into a form allowing a touch input, a push input or a combination thereof.

The rear input unit may be disposed to overlap the display 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display 151 may be implemented to have a larger screen.

In addition, the mobile terminal 100 may include a finger scan sensor which scans a user's fingerprint. The controller may use fingerprint information sensed by the finger scan sensor as an authentication means. The finger scan sensor may be installed in the display 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained. The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body. The battery 191 may receive power via a power cable connected to the interface unit 160. Also, the battery 191 may be (re)chargeable in a wireless manner using a wireless charger. The wireless charging may be implemented by magnetic induction or electromagnetic resonance.

Also, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display 151 to extend the function of the mobile terminal 100. Another example of the accessory may be a touch pen for assisting or extending a touch input onto a touch screen.

A multi-transmission system structure and a mobile terminal employing the multi-transmission system structure, and particularly, a power amplifier and a mobile terminal employing the power amplifier, in a heterogeneous radio system, according to an embodiment of the present disclosure will be described below with reference to the accompanying drawings. It is apparent to a person of ordinary skill in the art that other specific embodiments of the present disclosure can be implemented within the scope that does not depart from the nature and gist of the present disclosure.

Figure 2:
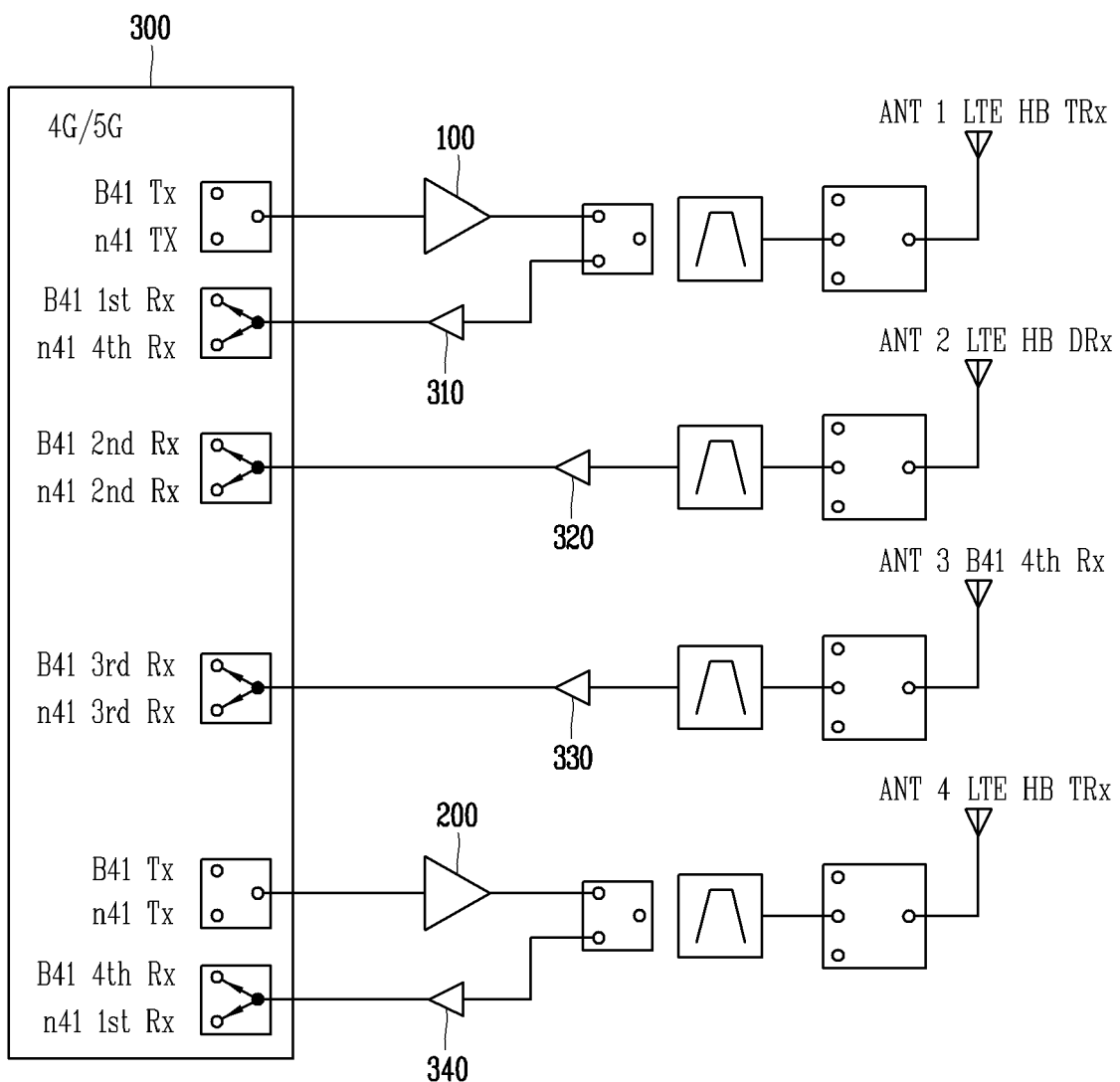
FIG. 2 is a diagram illustrating a multi-transceiving system that is operable in multiple radio communication systems according to the present disclosure.

FIG. 2 illustrates a multi-transmission system that is operable in multiple radio communication systems according to the present disclosure. With reference to FIG. 2, the mobile terminal includes a first power amplifier 100, a second power amplifier 200, and a controller 300. In addition, the mobile terminal includes multiple low noise amplifiers (LNA) 310 to 340 in its receiver. The first power amplifier 100, the second power amplifier 200, the controller 300, and the multiple low noise amplifiers 310 to 340 are all operable in a first communication system and a second communication system. For example, the first communication system and the second communication system may be a 4G communication system and a 5G communication system, respectively.

In a multi-transceiving system in FIG. 2, a transmitter and a receiver of each radio system are integrated into one transceiver. Therefore, there is an advantage in that a circuit part integrating two types of system signals is removed from an RF front end. In addition, it is possible that a front end component is controlled by the integration-obtained transceiver. Thus, front end components can be integrated more efficiently than when a transceiving system is separated on the per-communication system basis.

In addition, in the case of the separation on the per-communication system basis, it is impossible that a different communication system is controlled whenever necessary, or due to the resulting system delay, it is impossible that a resource is efficiently allocated. In contrast, it is possible that the multi-transceiving system as illustrated in FIG. 2 controls any other communication system, whenever necessary. Thus, there is an advantage in that the resulting system delay can be minimized and in that the efficient resource allocation is possible.

In addition, power amplifiers (PA), such as the first power amplifier 100 and the second power amplifier 200, are allocated to one transceiver. Thus, there is an advantage in that a UL-MIMO technology in which two different signals are sent with one system can be applied.

In addition, by integrating the transmitter and the receiver, an antenna is used that serves for the purpose of transmission and reception. Thus, two different radio communication systems can be realized with one antenna. In this case, as illustrated in FIG. 2, it is possible that 4×4 MIMO is realized using four antennas. In addition, it is possible that, of the four antennas, two antennas that are connected to the first power amplifier 100 and the second power amplifier 200, respectively, are used to realize 2×2 MIMO.

In addition, a splitter in the form of a switch is built into an RFIC that corresponds to the controller 300. Thus, there is no need to install a separate splitter outside of the RFIC. Thus, a mounting capability can be improved. Specifically, using a switch in the form of a single pole double throw (SPDT) inside of the RFIC that corresponds to the controller 300, it is possible that transmitters (TX) of two different communication systems are selected.

Figure 3A:
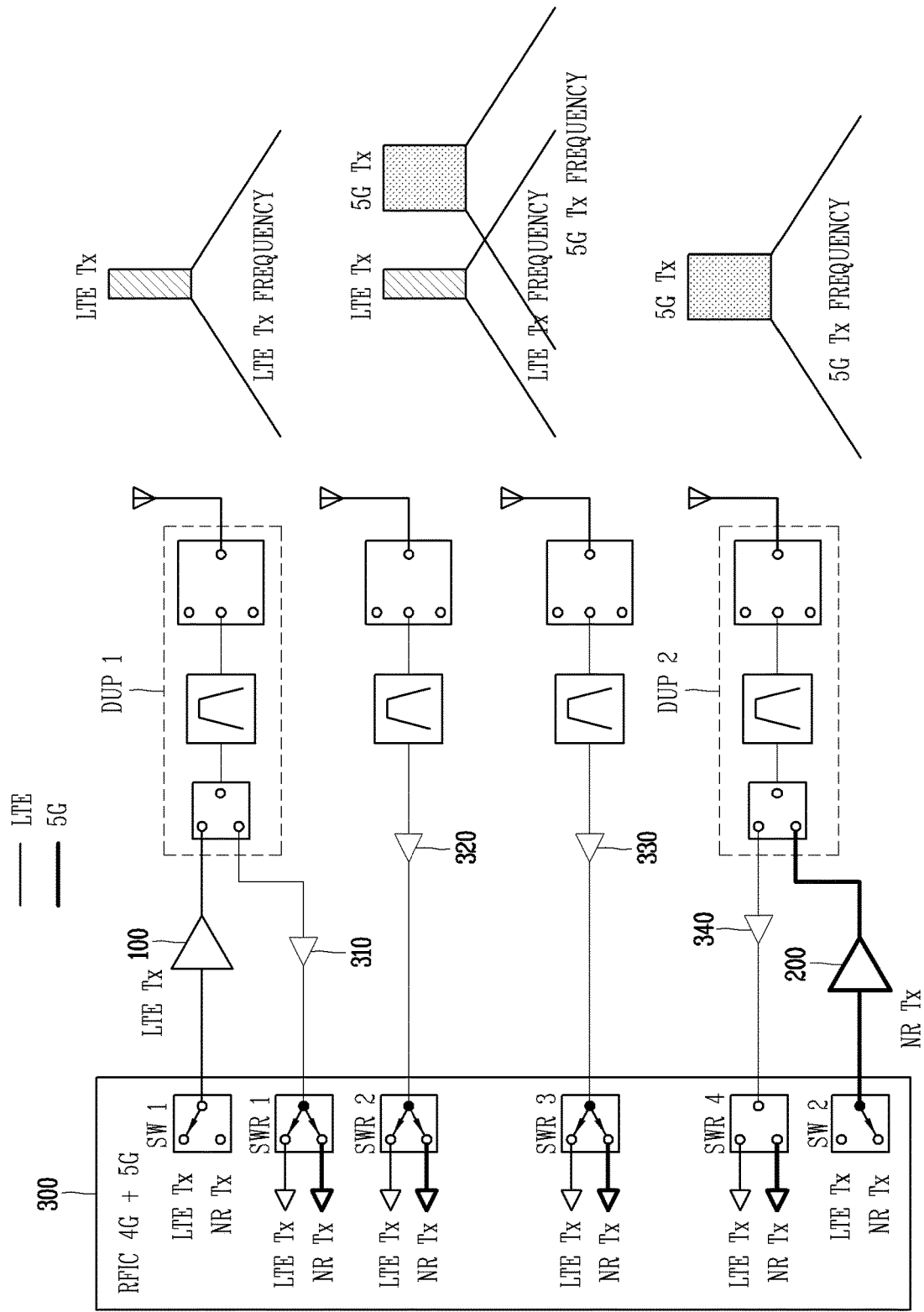
FIGS. 3A to 3C are diagrams, each illustrating configurations of an RFIC and of a power amplifier according to one of various types of operational examples in multiple radio communication systems according to the present disclosure.
Figure 3B:
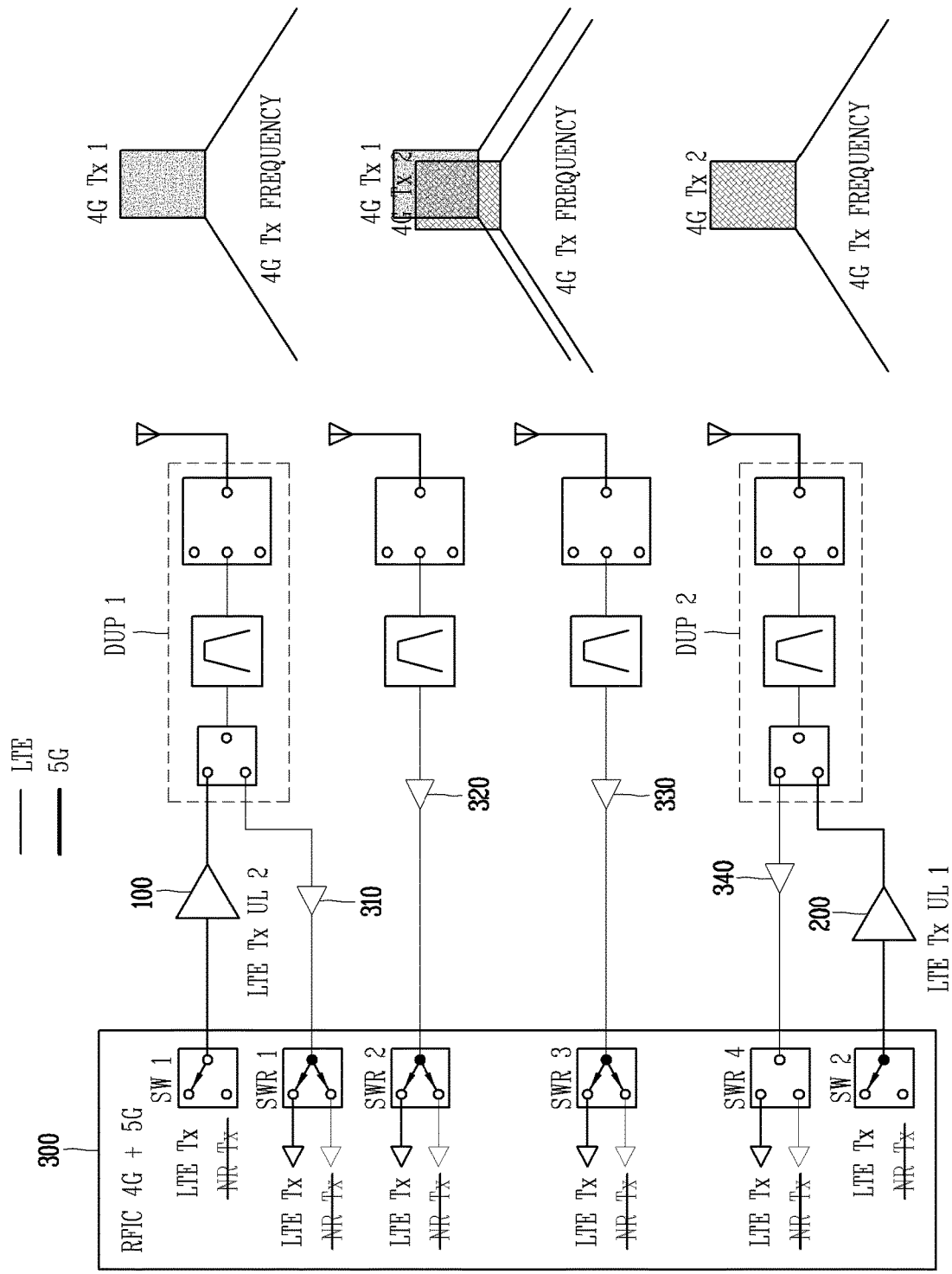
Figure 3C:
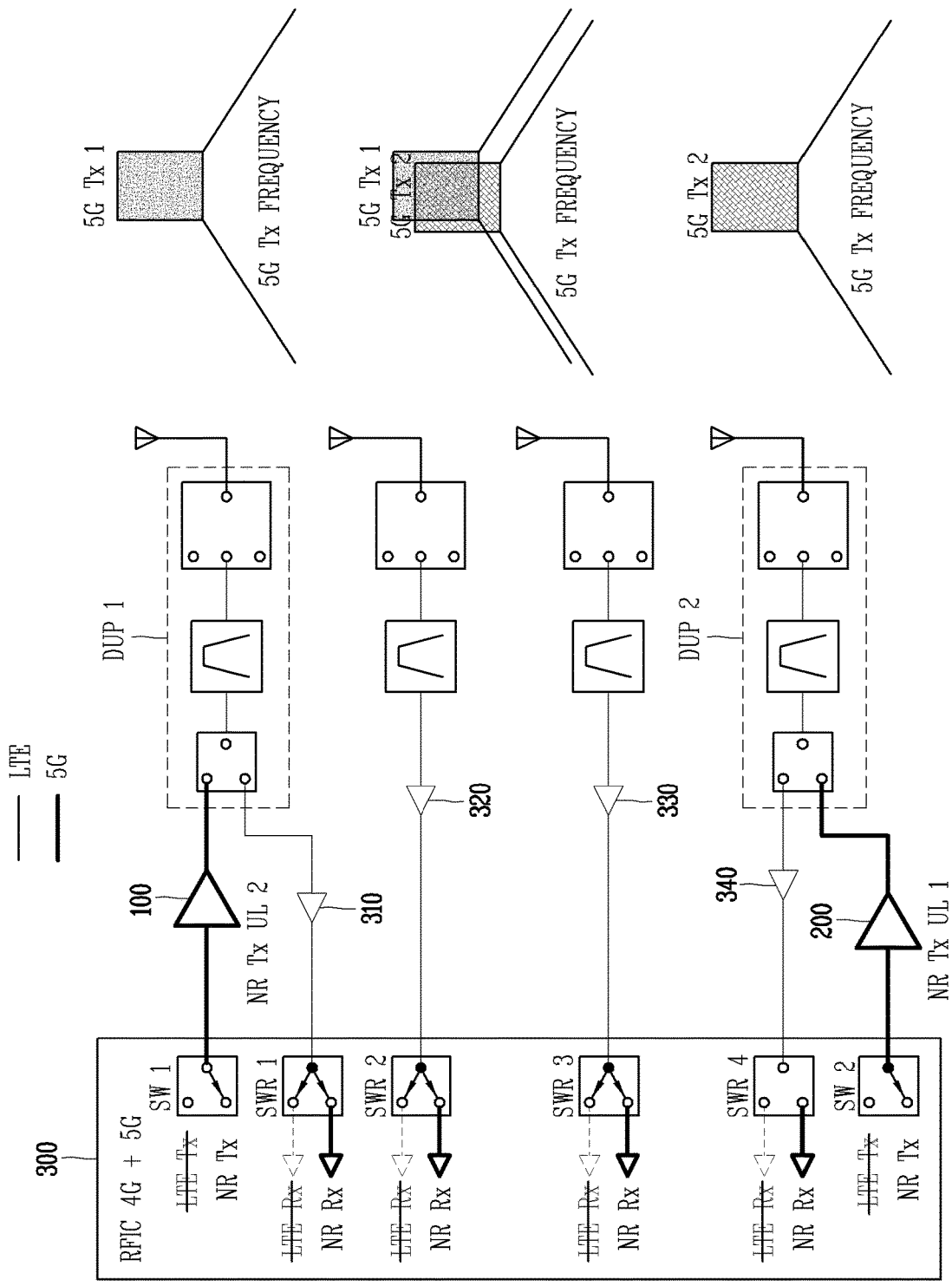

FIGS. 3A to 3C each illustrate configurations of the RFIC and of a power amplifier according to one of various types of operational examples in multiple radio communication systems according to the present disclosure. With reference to FIGS. 3A to 3C, the mobile terminal includes the first power amplifier 100, the second power amplifier 200, and the controller 300. Specifically, the first power amplifier 100 is configured to amplify and output a first signal, and the second power amplifier 200 is configured to amplify and output a second signal.

Also, the controller 300 can corresponds to the RFIC. In addition, the mobile terminal includes multiple low noise amplifiers (LNA) 310 to 340 in its receiver. Specifically, FIG. 3A illustrates a detailed configuration of a multi-communication system that performs a 4G+5G EN-DC operation according to the present disclosure.

According to an embodiment, the first signal of the first communication system and/or the second signal of the second communication system can be amplified and output. At this point, the first communication system and the second communication system may be a 4G communication system and a 5G communication system, respectively. In this case, 4G+5G (E-UTRAN NR Dual Connectivity (EN-DC) is possibly realized that allows for a concurrent connection to the first communication system and the second communication system. In addition, a broader broadband and a wider frequency band are used for a 5G TX frequency band than for an LTE (4G) TX frequency band. In this case, if LTE re-farming is applied partly, one or several portions of the LTE (4G) TX frequency band are used, and thus overlap can occur partly between two frequency bands.

Therefore, two transmitters perform transmission (or are connected) using their respective communication systems, and thus it is possible that the EN-DC operation is realized. Further, the receiver is realized in the form of branching off from within the RFIC chip, and thus the number of components that are mounted outside of the RFIC can be minimized.

In addition, FIG. 3B illustrates a detailed configuration of a multi-communication system that performs a 4G UL-MIMO operation according to the present disclosure. According to another embodiment, the first power amplifier 100 and the second power amplifier 200 can amplify and output the first signal and the second signal, respectively, of the first communication system. Therefore, it is possible that the 4G UL-MIMO is realized in the 4G communication system that is the first communication system.

To this end, two transmitters both perform LTE transmission and thus can perform the 4G
UL-MIMO operation. In addition, the receiver is realized in the form of branching off from within the RFIC chip, and thus the number of components that are mounted outside of the RFIC chip can be minimized.

In addition, FIG. 3C illustrates a detailed configuration of a multi-communication system that performs a 5G UL-MIMO operation according to the present disclosure. According to still another embodiment, the first power amplifier 100 and the second power amplifier 200 can amplify and output the first signal and the second signal, respectively, of the second communication system. Therefore, it is possible that the 5G UL-MIMO is realized in the 5G communication system that is the second communication system.

To this end, two transmitters both perform 5G transmission and thus can perform the 5G UL-MIMO operation. Also, the receiver is realized in the form of branching off from within the RFIC chip, and thus the number of components that are mounted outside of the RFIC chip can be minimized.

Specifically, it is possible that the first power amplifier 100 and the second power amplifier 200 both operate in multiple communication systems (that is, 4G and 5G communication systems). Accordingly, with the first power amplifier 100 and the second power amplifier 200, it is possible that the mobile terminal operates in the following multiple transfer modes. That is, the mobile terminal operates in one of a 4G UL MIMO mode, a 4G+5G EN-DC mode, and a 5G UL MIMO mode. In addition, switching among the multiple modes can be performed depending on a state of connection to the 4G and 5G communication systems and on whether or not multi-transmission is possible.

Accordingly, in the 5G UL MIMO mode, the first power amplifier 100 and the second power amplifier 200 can amplify and output the first signal and the second signal, respectively, of the 5G communication system. Accordingly, a first transmission signal and a second transmission signal that correspond to the amplified first signal and second signal, respectively, are transmitted to a first base station (a 5G base station) through a first antenna and a second antenna, respectively, within a timing error range, and thus 5G UL MIMO is performed.

In addition, in the 4G UL MIMO mode, the first power amplifier 100 and the second power amplifier 200 can amplify and output a third signal and a fourth signal, respectively, of the 4G communication system. Accordingly, a third transmission signal and a fourth transmission signal that correspond to the amplified third signal and fourth signal, respectively, are transmitted to a second base station (a 4G base station) through the first antenna and the second antenna, respectively, and thus 4G UL MIMO is performed.

In addition, in the 4G+5G EN-DC mode, one of the first and second power amplifiers 100 and 200 operates in the 4G communication system, and the other operates in the 5G communication system. Accordingly, the mobile terminal is in a 4G-5G E-UTRAN NR Dual Connectivity (EN-DC) state where connections to both the first base station (the 5G base station) and the second base station (the 4G base station) are established.

Further, the controller 300 can control each of the first power amplifier 100 and the second power amplifier 200 to amplify a signal of any one of the multiple communication systems. With reference to FIG. 3A, the first power amplifier 100 and the second power amplifier 200 can amplify the first signal and the second signal, respectively, of the first communication system. That is, the controller 300 can control the first power amplifier 100 and the second power amplifier 200 to amplify the first signal and the second signal, respectively, of the first communication system. Therefore, it is possible that the 4G UL-MIMO is realized in the 4G communication system that corresponds to the first communication system.

FIG. 3B illustrates a state where concurrent connections to different radio interfaces are established is possible, and thus concurrent transmissions through different radio interfaces are possible, or a single transmission through one radio interface is possible. The first power amplifier 100 and the second power amplifier 200 can amplify the first signal of the first communication system and/or the second signal of the second communication system, respectively. That is, the controller 300 can control the first power amplifier 100 and the second power amplifier 200 to amplify the first signal of the first communication system and the second signal of the second communication system, respectively.

Therefore, 4G+5G E-UTRAN NR Dual Connectivity (EN-DC) is possibly realized that allows for concurrent connections to the first communication system and the second communication system. In this case, a state where connections to both the 4G and 5G communication systems are established is attained, but data transmission and reception are performed only through any one communication system. Regarding selection of a radio interface (or a communication system), a radio interface that is the same as the previously employed radio interface is selected for an application in which session continuity is important. In contrast, a radio interface (or a communication system) that provides a satisfactory channel environment is selected for an application in which the session continuity is not important.

As illustrated in FIG. 3C, it is possible that the 5G UL-MIMO is realized using the first signal and the second signal of the 5G communication system. In this case, the first power amplifier 100 and the second power amplifier 200 can amplify the first signal and the second signal, respectively, of the second communication system. That is, the controller 300 can control the first power amplifier 100 and the second power amplifier 200 to amplify the first signal and the second signal, respectively, of the second communication system. Therefore, it is possible that the 5G UL-MIMO is realized in the 5G communication system that corresponds to the second communication system.

More specifically, the first power amplifier 100, as illustrated in FIG. 3C, can operate in the 5G communication system and can also operate, by a switch within the RFIC, in the 4G communication system. In addition, the second power amplifier 200, as illustrated in FIG. 3C, can operate in the 5G communication system and can also operate, by a switch within the RFIC, in the 4G communication system. Also, the first and second communication systems may be an LTE communication system and a 5G communication system, respectively. However, without being limited to this, the first and second communication systems may be freely set to be any other systems, according to the application.

In this connection, multiple switches SW1 and SW2, each of which makes switching between the 5G communication system and the 4G communication system possible, are included within the controller 300 that corresponds to the RFIC. As shown, a first transmission switch SW1 of the multiple switches is connected to the first power amplifier 100. In contrast, a second transmission switch SW2 of the multiple switches is connected to the second power amplifier 200.

That is, according to the present disclosure, as described above, it is possible that one of two system TX's is selected using an (SPDT) switch within a 4G/5G RFIC. In the related art, a power amplifier is separately provided for each communication system. By comparison, advantages that are provided by the present disclosure are described as follows.

In more detail, with the switch within the RFIC, the switching between the first and second communication systems can be performed, and thus the first and second power amplifiers 100 and 200 can support various types of UL-MIMO. Specifically, as illustrated in FIG. 3C, the 5G UL MIMO can be supported, and as illustrated in FIG. 3B, the 4G UL MIMO can be supported depending on switching-on. In addition, as illustrated in FIG. 3A, the 4G+5G EN-DC can be supported and at this time, any one of 4G single transmission, 5G single transmission, and 4G+5G UL MIMO transmission is possible. Accordingly, a mobile terminal can be provided that has an RF front-end common structure capable of supporting Uplink (UL) MIMO in multiple radio systems.

In addition, multiple reception switches SWR1 to SWR4, each of which makes the switching between the 5G communication system and the 4G communication system possible, are included within the controller 300 that corresponds to the RFIC. As shown, a first reception switch SWR1 of the multiple switches is connected to a first low noise amplifier 310, and a second reception switch SWR2 is connected to a second low noise amplifier 320. Also, a third reception switch SWR3 is connected to a third low noise amplifier 330, and a fourth reception switch SWR4 is connected to a fourth low noise amplifier 340.

Further, the first power amplifier 100 and the first low noise amplifier 310 are connected to the first antenna through a first duplexer DUP1, and the second power amplifier 200 and the fourth low noise amplifier 340 are connected to the second antenna through a second duplexer DUP2.

Also, the second and third low noise amplifiers 320 and 330 each may be configured only with the receiver, instead of being configured with the transmitter. As shown, a second reception switch SWR2 of the multiple switches can be connected to the second low noise amplifier 320, and a third reception switch SWR3 can be connected to the third low noise amplifier 330. Further, the second low noise amplifier 320 and the third low noise amplifier 330 can be connected to a third antenna and a fourth antenna, respectively, only through their respective filters without their respective separate duplexers. The structures and characteristics of the 4G+5G E-UTRAN NR Dual Connectivity (EN-DC), the 4G UL MIMO, and the 5G UL MIMO are described in detail above.

With reference to FIG. 3A to 3C, a configuration, a characteristic, and an advantage of the receiving reception are described as follows. As described in FIGS. 3A to 3C, two transmitters perform transmission through their respective systems, and thus, when the EN-DC operation is realized, the receiver has the following advantages. Specifically, the receiver has the form of branching off from within the RFIC chip into an LTE-TX and an NR-TX. Thus, there is an advantage in that the number of external components is minimized.

Further, in order to achieve the above-described objectives or other objectives, according to another aspect of the present disclosure, there can be provided a mobile terminal that has an improved timing alignment error characteristic. In addition, timing alignment at a higher level is necessary for the second communication system, such as the 5G communication system, than in the first communication system, such as LTE. In this connection, sufficient detail is provided as follows.

In particular, the UL-MIMO technology is a technology that is also standardized in 4G, but has a problem in that two or more power trackers are difficult to practically use in terms of a cost, a mounting area, and the like. In order to solve this problem, according to the present disclosure, buck-boost converters are integrated. In addition, according to the present disclosure, an integration-type buck-boost converter, for example, a voltage booster is provided. The reason for this is because the requirement for time alignment increases in comparison with 4G LTE.

Figure 4:
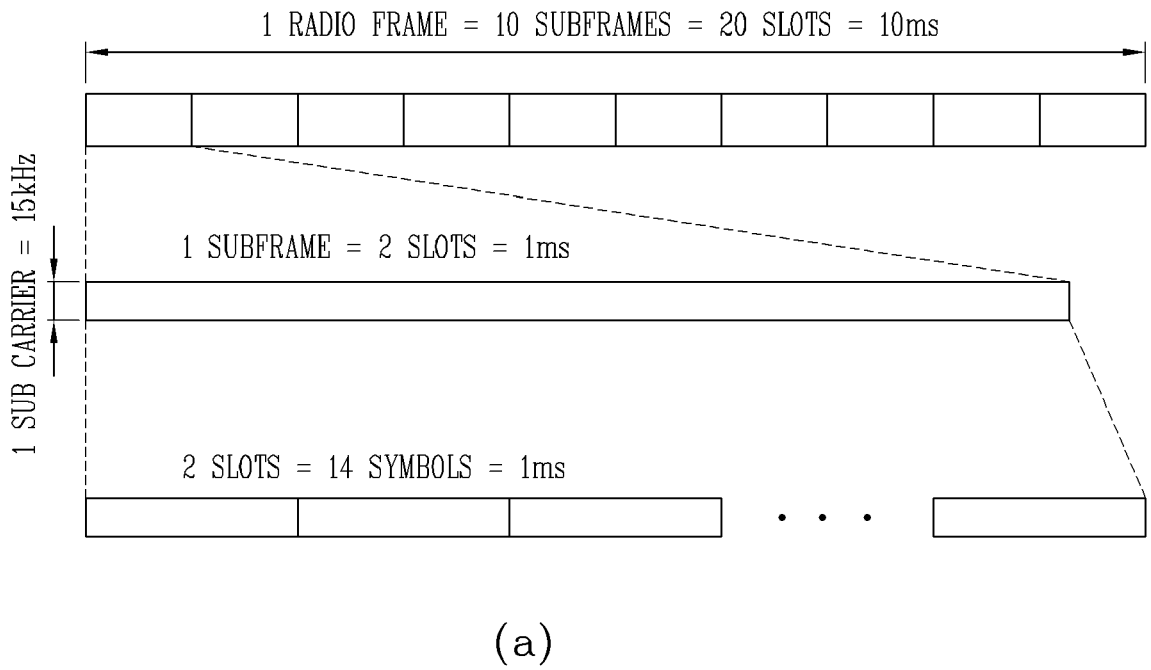
FIG. 4 is a diagram illustrating an LTE subframe structure and an LTE minimum controller, and an NR subframe structure and an NR minimum controller according to the present disclosure.
Figure 4:
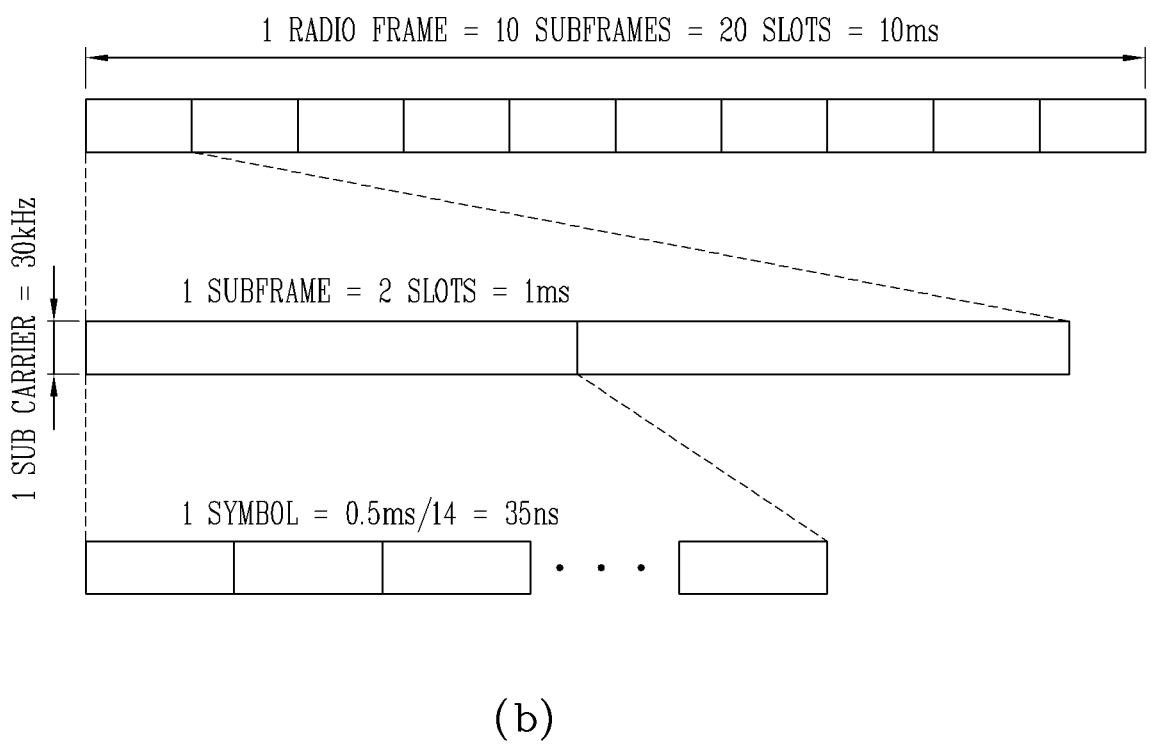

Next, FIG. 4 illustrates an LTE subframe structure and an LTE minimum controller, and an NR subframe structure and an NR minimum controller according to the present disclosure. With reference to FIG. 4(a), an LTE radio frame is made up of 10 subframes, and each subframe is made up of two slots. Thus, the LTE radio frame is made up of a total of 20 slots. In this case, the LTE radio frame has a time section of 10 ms, and the subframe has a time section of 1 ms. In addition, two slots that have a time section of 1 ms are made up of 14 symbols, and thus the minimum controller is 1 ms.

In contrast, with reference to FIG. 4(b), a new radio (NR) subframe that corresponds to a 5G subframe is made up of two slots, and 14 symbols are present in each slot of which a unit is 0.5 ms. In this case, in the 5G communication system, the minimum controller is a symbol, and the minimum controller is 0.5 ms/14=35 ns. Therefore, the requirement for the timing alignment in the 5G communication system increases to approximately 28 times than that in the 4G communication system.

Figure 5A:
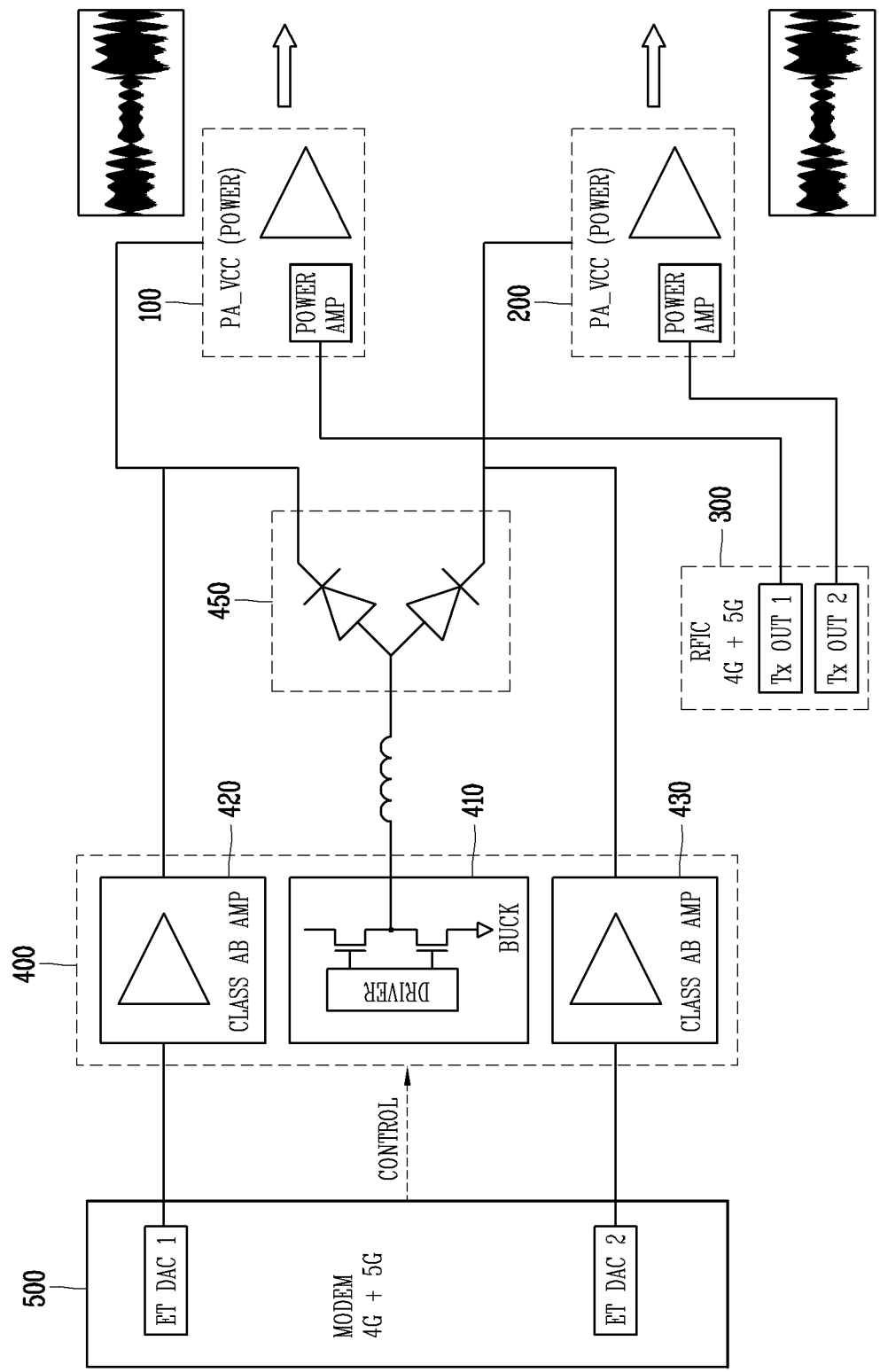
FIG. 5A is a diagram illustrating a configuration of multiple power amplifiers each of which uses a common voltage booster according to the present disclosure.

In order to satisfy the requirement for the timing alignment, a discriminative timing control method and a configuration for realizing this method are necessary for the 5G communication system. In this connection, FIG. 5A illustrates a configuration of multiple power amplifiers each of which uses a common voltage booster according to the present disclosure. With reference to FIG. 5A, the first power amplifier 100 is configured to amplify and output the first signal, and the second power amplifier 200 is configured to amplify and output the second signal. According to an embodiment, the first power amplifier 100 and the second power amplifier 200 can amplify and output the first signal and the second signal, respectively, of the 5G communication system. However, no limitation to this is imposed, and the first signal of the first communication system and the second signal of the second communication system can be amplified and output. Alternatively, the first signal and the second signal of the first communication system can be amplified and output. The first communication system and the second communication system may be the 4G communication system and the 5G communication system, respectively.

When the 5G communication system separately includes a power controller, that is, a PA booster, and where powers for the first and second power amplifiers are controlled by the separate PA booster, the following problems can occur. In this connection, FIG. 5B illustrates a configuration of multiple power amplifiers each of which uses a separate power booster according to the present disclosure.

Figure 5B:
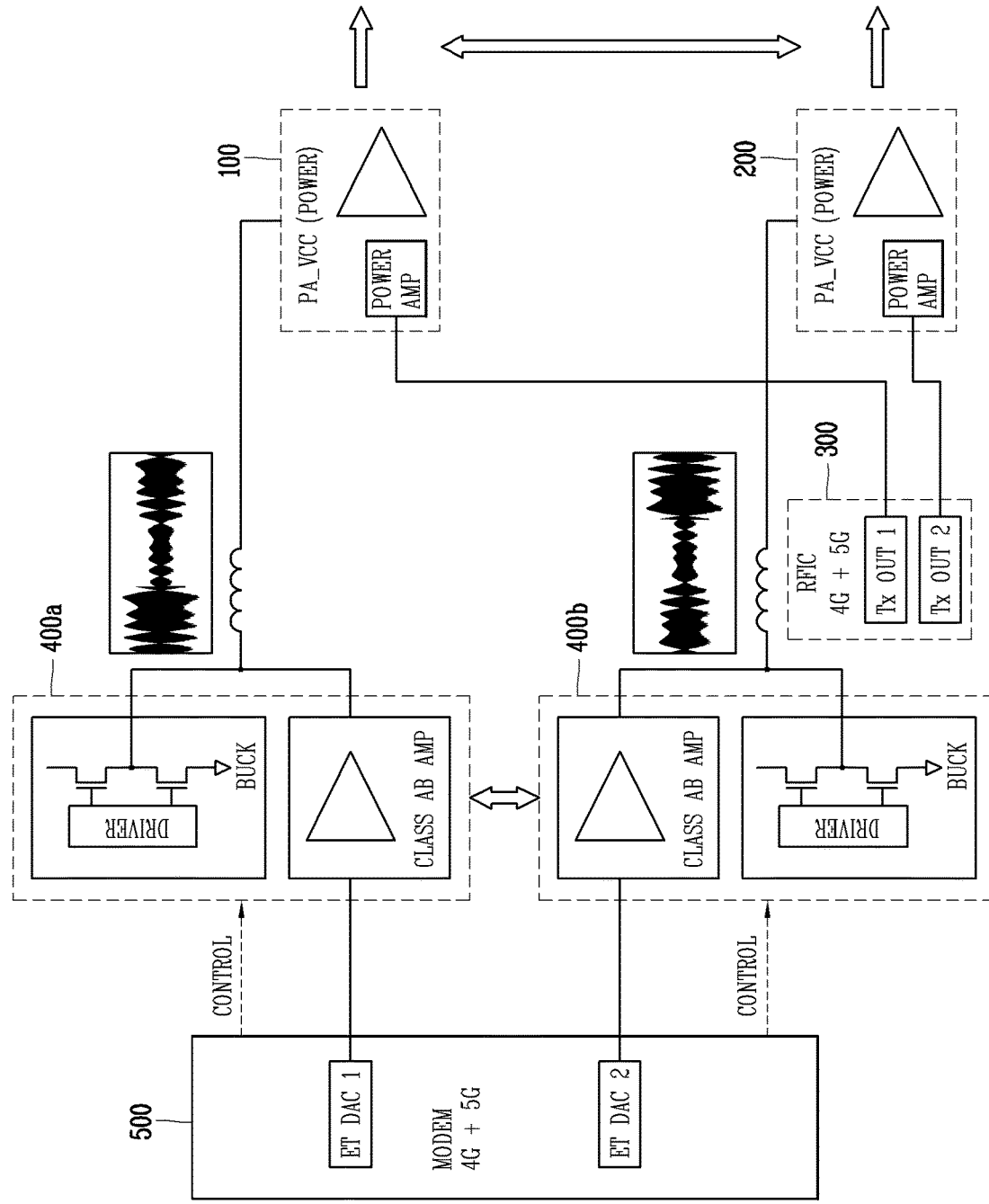
FIG. 5B is a diagram illustrating a configuration of multiple power amplifiers each of which uses a separate power booster according to the present disclosure.

With reference to FIG. 5B, if two power controllers 400a and 400b are separately provided for multiple radio communication systems, a hardware configuration is optimized, but a problem in the timing synchronization occurs. For example, when the 4G UL-MIMO operation is performed, each transmitter of the 4G communication system, as described above, depends on a minimum controller level on the basis of per-symbol that corresponds to 1 ms. Accordingly, an average power control and timing synchronization have to be performed at the minimum controller level of 1 ms.

When the 5G UL-MIMO operation is performed, each transmitter of the 5G communication system, as described above, depends on a minimum controller level on the basis of per-symbol that corresponds to 35 ns. Accordingly, an average power control and timing synchronization have to be performed at the minimum controller level of 35 ns.

In order to solve these problems, with reference to FIG. 5A, a power controller 400 is configured to be connected to the first power amplifier 100 and the second power amplifier 200 and thus to control voltage that is to be applied to the first power amplifier 100 and the second power amplifier 200. In addition, the power controller 400 includes a voltage booster 410 that provides a supply voltage to the first power amplifier 100 and the second power amplifier 200. The voltage booster 410 provides the supply voltage to multiple power amplifiers at the same time through one voltage booster and thus can be referred to as a common voltage booster. Therefore, there is an advantage in that the supply voltage to the first power amplifier 100 and the second power amplifier 200 can be controlled at the same time by one voltage booster 410.

With reference to FIGS. 4 and 5A, it is possible that a timing error is adjusted within a 5G symbol time section (that is, a symbol duration) through one voltage booster. That is, with the supply voltage that is provided by the voltage booster 410 to the first power amplifier 100 and the second power amplifier 200 at the same time, it is possible that the timing error is adjusted within the 5G symbol time section (that is, the symbol duration). Therefore, with the supply voltage that is provided at the same time, it is possible that a timing error between the first transmission signal that is output by the first power amplifier 100 and the second transmission signal that is output by the second power amplifier 200 is adjusted to be equal to or shorter than the symbol duration of the 5G communication system.

With reference to FIG. 5A, the controller of the mobile terminal according to the present disclosure may further include a modem 500, separately from an RFIC 300 that controls the first power amplifier 100 and the second power amplifier 200. In this case, the voltage booster 410 can be controlled by a control signal in the modem 500.

Further, it is possible that the modem 500 according to the present disclosure operates both in the 4G communication system and the 5G communication system. Accordingly, the modem 500 can process multiple different signals of the 4G communication system and the 5G communication system.

Specifically, the modem 500 can control the first and second power amplifiers 100 and 200 so any one of 2×2 4G UL MIMO, 4G-5G EN-DC, and 2×2 5G UL MIMO is performed through the first antenna and the second antenna. In contrast, regarding the control of the receiver, the modem 500 can perform any one of 4×4 4G Downlink (DL) MIMO, 4G-5G EN-DC, and 4×4 5G DL MIMO through the first antenna to the fourth antenna.

In addition, first and second driving amplifiers 420 and 430 that are connected to the first and second power amplifiers 100 and 200, respectively, of a multi-transmitter according to the present disclosure are included, and individual envelope control is accordingly possible.

Also, the first driving amplifier 420 is connected to the first power amplifier 100, amplifies a signal that is output from the modem 500, and thus can provide the amplified signal to the first power amplifier 100. In addition, the second driving amplifier 430 is connected to the second power amplifier 200, amplifies a signal that is output from the modem 500, and thus can provide the amplified signal to the second power amplifier 200. Thus, with the first driving amplifier 420 and the second driving amplifier 430 provided separately, it is possible that control is performed on the per-resource block (RB) basis. In addition, envelopes of the first signal and the second signal that are input into the first and second power amplifiers 100 and 200, respectively, can be controlled according to an individual radio access technology (RAT).

Specifically, it is possible that the first and second driving amplifiers 420 and 430 control an envelope-based power level on the per-resource block (RB) basis. To this end, the modem 500 can perform envelope tracking (ET) associated with the first signal and the second signal, on the per-resource block (RB) basis. Accordingly, there is an advantage in that the first driving amplifier 420 and the second driving amplifier 430 can individually adjust power levels, respectively, of the first signal and the second signal, based on a result of the envelope tracking.

In this connection, it is assumed that input powers into the first and second driving amplifiers 420 and 430 are defined as $P_{in,1}$ and $P_{in,2}$, respectively, and that gains of the first and second driving amplifiers 420 and 430 are defined as $G_1$ and $G_2$, respectively. In addition, it is assumed that gains of the first and second power amplifiers 100 and 200 are defined as $G_{P1}$ and $G_{P2}$, respectively, and that output powers of the first and second power amplifiers 100 and 200 are defined as $P_{out,1}$ and $P_{out,2}$, respectively. Further, a common voltage is provided by the voltage booster 410 to the first and second power amplifiers 100 and 200, and thus the gains of the first and second power amplifiers 100 and 200 are $G_P$ and have the same gain value.

In this case, a difference in power level due to mismatch between different paths for the transmitter is compensated for, and thus power levels of the first signal and the second signal can be adjusted individually. In addition, a unit of input power (for example, the per-subframe basis) is higher than an RB level, and power control is performed. Thus, it is assumed that $P_{in,1}=P_{in,2}=P_{in}$ at an RB level. In this case, it is assumed that mismatch levels that depend on a first transmission path and a second transmission path are $M_1$ and $M_2$, respectively.

Accordingly, it is assumed that $P_{out,1}=P_{in}*G_1*G_P*M_1$ is established for the first transmission path and that $P_{out,2}=P_{in}*G_2*G_P*M_2$ is established for the second transmission path. In this case, power level tracking is performed in the first and second power amplifiers 100 and 200, and, when power level difference $|P_{out,1}-P_{out,2}|$ is at or higher than D P (threshold), individual power control is possible at the RB level.

For example, when $P_{out,2}$ has a lower value than $P_{out,1}$ a gain $G_2$ of the second driving amplifier 430 can be increased to $G_2+DG$. Conversely, when $P_{out,1}$ has a lower value than $P_{out,2}$, a gain $G_1$ of the first driving amplifier 420 can be increased to $G_1+DG$. Accordingly, individual power control is possible at the RB level in such a manner that $|P_{out,1}-P_{out,2}|D P$ (threshold).

In addition, when output powers of the first and second power amplifiers 100 and 200 approach a saturated power, a gain of any one of the first and second driving amplifiers 420 and 430 can be decreased. For example, when $P_{out,2}$ has a lower value than $P_{out,1}$, the gain $G_1$ of the first driving amplifier 420 can be decreased to $G_1-DG$. Conversely, when $P_{out,1}$ has a lower value than $P_{out,2}$, the gain $G_2$ of the second driving amplifier 420 can be decreased to $G_2-DG$. Accordingly, individual power control is possible at the RB level in such a manner that $|P_{out,1}-P_{out,2}|D P$ (threshold).

Further, a difference in power level due to an environment of a channel between different MIMO transmission streams between the first base station (the 5G base station) and the mobile terminal is compensated for, and thus the power levels of the first signal and the 2signal can be adjusted individually. In this connection, the environment of the channel between different MIMO transmission streams may be an environment where different paths losses occur or different interference levels (SINR levels according to this) is reached. Accordingly, it is assumed that $P_{out,1}=P_{in}*G_1*G_P*L_1$ is established for a first channel path and that $P_{out,2}=P_{in}*G_2*G_P*L_2$ is established for the second channel path. In this case, $L_1$ and $L_2$ may be pass losses for the first channel path and the second channel path, respectively.

In this case, the power level tracking is performed in the first and second power amplifiers 100 and 200, and, when power level difference $|P_{out,1}-P_{out,2}|$ is at or higher than D $P_2$ (second threshold), individual power control is possible at the RB level. In this case, a power difference between channel paths has a high value than a power difference between transmission paths for an internal circuit. Therefore, the second threshold for the power difference between channel paths can be set to be higher than a first threshold for the power difference between transmission paths.

In a manner similar to a transmission path-based compensation method, when $P_{out,2}$ has a lower value than $P_{out,1}$, the gain $G_2$ of the second driving amplifier 430 can be increased to $G_2+DG_2$. Conversely, when $P_{out,1}$ has a lower value than $P_{out,2}$, the gain $G_1$ of the first driving amplifier 420 can be increased to $G_1+DG_2$. Accordingly, individual power control is possible at the RB level in such a manner that $|P_{out,1}-P_{out,2}|D P_2$ (the second threshold).

When the output powers of the first and second power amplifiers 100 and 200 approach a saturated power, the gain of any one of the first and second driving amplifiers 420 and 430 can be decreased. For example, when $P_{out,2}$ has a lower value than $P_{out,1}$, the gain $G_1$ of the first driving amplifier 420 can be decreased to $G_1-DG_2$. Conversely, when $P_{out,1}$ has a lower value than $P_{out,2}$, the gain $G_2$ of the second driving amplifier 420 can be decreased to $G_2-DG_2$. Accordingly, individual power control is possible at the RB level in such a manner that $|P_{out,1}-P_{out,2}|<D P_2$ (the second threshold). In this case, it is possible that a change level $DG_2$ for compensating for the power difference between channel paths is set to have a higher value than a change level DG for compensation for the power difference between the transmission paths.

For an improvement in isolation between the first power amplifier 100 and the second power amplifier 200, a diode 450 may be provided between the power controller 400 and each of the first power amplifier 100 and the second power amplifier 200. Specifically, the diode 450 may be provided between the voltage booster 410 and the first power amplifier 100, and between the voltage booster 410 and the second power amplifier 200.

The power controller 400 that corresponds to a PA booster is used in a shared manner, and thus a value of PA_VCC Avg can be supplied to two PA's in the same manner. That is, the result is 1-Module, 1-Control, and 1 Buck, and thus the value of PA_VCC Avg is supplied to two PA's in the same manner. In addition, for a power level change, two Tx's are also the same in Sync. When a timing error at a precise level is required as in the 5G communication system, it is particularly important that two Tx's are also the same in Sync.

In contrast, as illustrated in FIG. 5A, unlike in the voltage booster 410, separate driving amplifiers 420 and 430 may be provided. In this case, the first and second amplifiers 420 and 430 may be Class AB amplifiers, but no limitation to this is imposed. With the amplifier that is provided separately, the envelope on the per-resource block (RB) basis is controlled according to an individual radio access technology (RAT).

Configurations of the power controller and the control method according to the present disclosure, which are described above, are described as follows. That is, one type of the PA booster is provided, the same PA_VCC is supplied at the same time, and an envelope that has to vary from one resource to another can be covered with an individual ET DAC. Further, a PA Booster may be the power controller 400, and, as described above, includes a separate amplifier. The envelope on the per-RB basis is controlled according to an individual RA.

In addition, the multi-transmission system structure, the mobile terminal employing the multi-transmission system, and the method of controlling the mobile terminal, according to the present disclosure, are not limited to UL-MIMO, and, according to application, are possibly utilized for UL-diversity. In this connection, UL-MIMO and UL-diversity are described as follows.

With reference to FIG. 5A, when UL-MIMO is performed, one power controller 400 and two driving amplifies (Class AB Amp) may be used. Accordingly, there is an advantage in that timing alignment between multiple transmission signals in the 5G communication system is possible and that control of the envelope on the per-resource basis is possible.

When UL-diversity is performed, only one power controller 400 and one driving amplifier (Class AB amp) can be used. Accordingly, the timing alignment between multiple transmission signals in the 5G communication system is possible and a reduction in power consumption due to driving of a separate amplifier is possible.

However, when UL-diversity is performed, one driving amplifier (Class AB Amp) is not necessarily used, and two driving amplifiers may be used. In addition, the mobile terminal operates to switch between UL-MIMO and UL-diversity according to a channel state. Therefore, depending on application, it is desirable that one power controller 400 is used considering swift switching between UL-MIMO and UL-diversity, but that a separate driving amplifier is used.

The multi-transmission system structure and the mobile terminal employing the multi-transmission system structure, according to the present disclosure, are described above. Technical effects of the power amplifier and the mobile terminal employing the power amplifier in the heterogeneous radio system are described as follows.

According to at least one of the embodiments of the present disclosure, the mobile terminal employing the RF front-end common structure capable of supporting UL MIMO in multiple radio systems can be provided. Accordingly, there is an advantage in that, in various types of MIMO structures, space for deployment decreases, power consumption decreases, and control complexity decreases.

According to at least one of the embodiments of the present disclosure, the mobile terminal that has an improved timing alignment error characteristic when performing multiple uplink transmissions can be provided. Specifically, there is an advantage in that the hardware structure and the control method can be provided that is capable of controlling the timing alignment error between channels for the multiple power amplifiers that are included in the 5G communication system, in such a manner that the timing alignment error falls to a specific level or lower.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

In relation to the aforementioned present disclosure, design and operations of a transmitter including a power amplifier and a transceiver, a receiver including a low-noise amplifier, and RFIC can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. A mobile terminal comprising:
   a first power amplifier configured to amplify and output a first signal of a 5G communication system;
   a first antenna connected to the first power amplifier and configured to transmit the first signal amplified and output from the first power amplifier as a first transmission signal;
   a second power amplifier configured to amplify and output a second signal of the 5G communication system;
   a second antenna connected to the second power amplifier and configured to transmit the second signal amplified and output from the second power amplifier as a second transmission signal;
   a power controller connected to the first power amplifier and the second power amplifier and including a common voltage booster configured to provide a supply voltage to both of the first power amplifier and the second power amplifier at a same timing; and
   a modem operable in a 4G communication system and the 5G communication system and configured to provide a control signal to the power controller.

2. The mobile terminal according to claim 1, wherein the power controller further comprises:
   a first driving amplifier connected to the first power amplifier, and configured to amplify a first modem signal output from the modem, and to provide the amplified first modem signal to the first power amplifier, wherein the first power amplifier amplifies and outputs the amplified first modem signal as the first signal; and
   a second driving amplifier connected to the second power amplifier, and configured to amplify a second modem signal output from the modem, and to provide the amplified second modem signal to the second power amplifier, wherein the second power amplifier amplifies and outputs the amplified second modem signal as the second signal, and
   wherein the modem controls envelopes of the first signal and the second signal on a per-resource block (RB) basis according to an individual radio access technology (RAT).

3. The mobile terminal according to claim 2, wherein the modem performs envelope tracking (ET) associated with the first signal and the second signal, on the per-resource block (RB) basis, and
   wherein the first driving amplifier and the second driving amplifier adjust power levels of the amplified first modem signal input to the first power amplifier and the amplified second modem signal input to the second power amplifier based on a result of the envelope tracking.

4. The mobile terminal according to claim 1, further comprising:
   a diode provided between the common voltage booster and the first power amplifier and between the common voltage booster and the second power amplifier to provide isolation between the first power amplifier and the second power amplifier.

5. The mobile terminal according to claim 1, wherein one of the first power amplifier and the second power amplifier operates in the 4G communication system, and the other operates in the 5G communication system to perform 4G-5G E-UTRAN NR Dual Connectivity (EN-DC).

6. The mobile terminal according to claim 1, wherein the power controller includes multiple switches for switching between the 5G communication system and the 4G communication system, and
wherein a first transmission switch of the multiple switches is connected to the first power amplifier, and a second transmission switch of the multiple switches is connected to the second amplifier.

7. The mobile terminal according to claim 6, wherein a first reception switch of the multiple switches is connected to a first low noise amplifier, and a second reception switch is connected to a second low noise amplifier,
wherein the first power amplifier and the first low noise amplifier are connected to the first antenna through a first duplexer, and
wherein the second power amplifier and the second low noise amplifier are connected to the second antenna through a second duplexer.

8. The mobile terminal according to claim 7, wherein a third reception switch of the multiple switches is connected to a third low noise amplifier, and a fourth reception switch is connected to a fourth low noise amplifier, and
wherein the third low noise amplifier and the fourth low noise amplifier are connected to a third antenna and a fourth antenna, respectively.

9. The mobile terminal according to claim 8, wherein the modem performs any one of 2×2 4G UL MIMO, 4G-5G EN-DC, and 2×2 5G UL MIMO through the first antenna and the second antenna.

10. The mobile terminal according to claim 9, wherein the modem performs any one of 4×4 4G Downlink (DL) MIMO, 4G-5G EN-DC, and 4×4 5G DL MIMO through the first antenna to the fourth antenna.

11. A mobile terminal comprising:
a first power amplifier configured to amplify and output a first signal of a 5G communication system;
a first antenna connected to the first power amplifier and configured to transmit the first signal amplified and output from the first power amplifier as a first transmission signal;
a second power amplifier configured to amplify and output a second signal of the 5G communication system;
a second antenna connected to the second power amplifier and configured to transmit the second signal amplified and output from the second power amplifier as a second transmission signal; and
a power controller connected to the first power amplifier and the second power amplifier and including a common voltage booster configured to provide a supply voltage to both of the first power amplifier and the second power amplifier at a same timing,
wherein a timing error between the first signal output by the first power amplifier and the second signal output by the second power amplifier is controlled to be equal to or shorter than a time section associated with a symbol duration of the 5G communication system.

12. The mobile terminal according to claim 11, wherein the first antenna is configured to transmit the first transmission signal to a first base station, and the second antenna is configured to transmit the second transmission signal to the first base station to perform 5G Uplink (UL) MIMO.

13. The mobile terminal according to claim 12, wherein the first power amplifier is further configured to amplify and output a third signal of the 4G communication system, and wherein the second power amplifier is further configured to amplify and output a fourth signal of the 4G communication system.

14. The mobile terminal according to claim 13, wherein the first antenna is configured to transmit the third signal amplified and output from the first power amplifier as a third transmission signal to a second base station, and
wherein the second antenna is configured to transmit the fourth signal amplified and output from the second power amplifier as a fourth transmission signal to the second base station to perform 4G Uplink (UL) MIMO.

15. A mobile terminal comprising:
a first power amplifier configured to amplify and output a first signal;
a second power amplifier configured to amplify and output a second signal;
a common voltage booster configured to provide a supply voltage to the first power amplifier and the second power amplifier;
a diode provided between the common voltage booster and the first power amplifier and between the common voltage booster and the second power amplifier to provide isolation between the first power amplifier and the second power amplifier; and
a controller configured to control the first power amplifier and the second power amplifier to operate in any one of the 5G communication system and the 4G communication system.

16. The mobile terminal according to claim 15, further comprising:
a first driving amplifier connected to the first power amplifier, and configured to amplify a first modem signal output from a modem, and provide the first amplified first modem signal as the first signal to the first power amplifier; and
a second driving amplifier connected to the second power amplifier, and configured to amplify a second modem signal output from the modem, and provide the amplified second modem signal as the second signal to the second power amplifier,
wherein the modem controls envelopes of the first signal and the second signal on a per-resource block (RB) basis according to an individual radio access technology (RAT),
wherein the controller performs envelope tracking (ET) associated with the first signal and the second signal on the per-resource block basis, and
wherein the first driving amplifier and the second driving amplifier adjust power levels of the first signal and the second signal, based on a result of the envelope tracking.

17. The mobile terminal according to claim 15, wherein the controller includes multiple switches for switching between the 5G communication system and the 4G communication system, and
wherein a first transmission switch of the multiple switches is connected to the first power amplifier, and a second transmission switch of the multiple switches is connected to the second amplifier.

18. The mobile terminal according to claim 17, wherein a first reception switch of the multiple switches is connected to a first low noise amplifier, and a second reception switch is connected to a second low noise amplifier,
wherein the first power amplifier and the first low noise amplifier are connected to a first antenna through a first duplexer, wherein the second power amplifier and the second low noise amplifier are connected to a second antenna through a second duplexer, wherein a third reception switch of the multiple switches is connected to a third low noise amplifier, and a fourth reception switch is connected to a fourth low noise amplifier, and wherein the third low noise amplifier and the fourth low noise amplifier are connected to a third antenna and a fourth antenna, respectively.

19. The mobile terminal according to claim 18, wherein the controller performs any one of 2×2 4G UL MIMO, 4G-5G EN-DC, and 2×2 5G UL MIMO through the first antenna and the second antenna, and performs any one of 4×4 4G Downlink (DL) MIMO, 4G-5G EN-DC, and 4×4 5G DL MIMO through the first antenna to the fourth antenna.

\* \* \* \* \*